Sept. 19, 1967  W. R. WHATELY ET AL  3,342,424
TITANIUM DIOXIDE PIGMENT AND PREPARATION
Filed Aug. 25, 1965
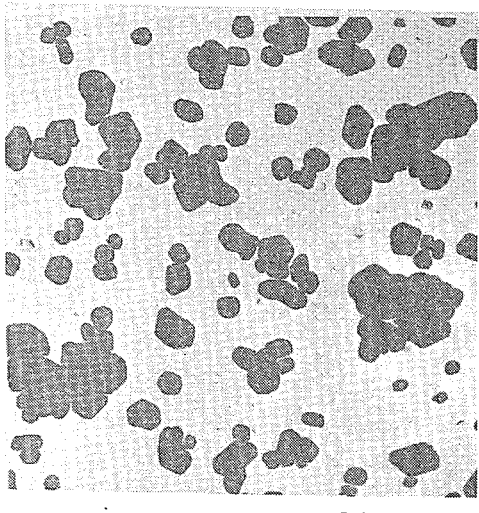
Fig. 1.  20,000X
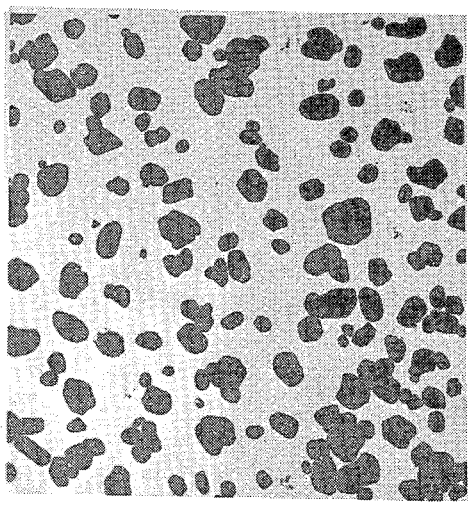
Fig. 2.  20,000X
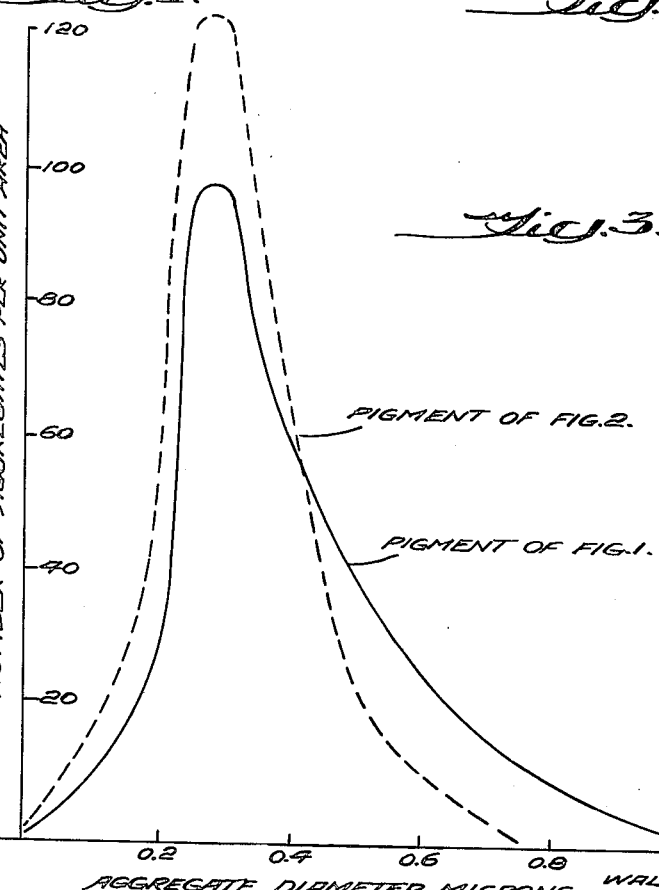
Fig. 3.
INVENTORS
WALTER R. WHATELY,
GEORGE L. ROBERTS, Jr.
GERARD M. SHEEHAN,
WILLIAM S. CASTOR, Jr.
BY Wm. P. Spielman
ATTORNEY United States Patent Office 3,342,424
Patented Sept. 19, 1967

3,342,424
TITANIUM DIOXIDE PIGMENT AND
PREPARATION
Walter R. Whately, George L. Roberts, Jr., and Gerard M. Sheehan, Lynchburg, Va., and William S. Castor, Jr., Allendale, N.J., assignors to American Cyanamid Company, Stamford, Conn., a corporation of Maine
Filed Aug. 25, 1965, Ser. No. 482,548
12 Claims. (Cl. 241—21)

ABSTRACT OF THE DISCLOSURE

In a $TiO_2$ pigment containing both ultimate particles less than 0.4 micron in size and aggregates in the size range of 0.4 to 4 microns, the aggregates are broken down by dispersing the pigment in an inert liquid, preferably water, together with 2 to 20 times its weight of inert grinding particles from 10 to 40 mesh in size, and agitating the mixture at a speed and for a time sufficient to improve the tint tone and tinting strength of the pigment.

This is a continuation-in-part of our copending application Ser. No. 265,037, filed Mar. 14, 1963, and now abandoned, which is a continuation-in-part of our earlier application Ser. No. 117,239, filed July 14, 1961, now abandoned.

This invention relates to new titanium dioxide pigments and to methods for their production. The invention also relates to a novel titanium dioxide finishing procedure that is applicable to any particulate titanium dioxide pigments that contain oversize aggregates; the method can therefore be used to improve and upgrade pigments which are known as well as to provide those which are new.

A principal object of our invention is the up-grading of titanium dioxide pigments, preferably during the finishing thereof, by applying thereto a particular grinding or attrition procedure which will selectively break down oversize aggregates therein. We have found that when this procedure is applied properly and to a sufficient extent it will impart both a better tint tone and an improved tinting strength to the pigments.

Another important object of our invention is the provision of novel classes of particulate rutile and anatase titanium dioxide pigments. Our new pigments are characterized by an improved tinting strength, a bluer tint tone, and a low content of oversize aggregates of smaller size, as compared with the corresponding rutile and anatase pigments of commerce that have not been treated by the process of our invention.

Additional objectives and features of our invention will become apparent from the following explanation and description of preferred embodiments thereof when taken with the appended claims.

In its broadest aspects our invention is based on the concept of providing a much greater uniformity in the particle size of a body of particulate titanium dioxide pigments than has previously been considered commercially feasible. Examination of the finished titanium dioxide pigments of commerce shows a remarkable disparity in particle size; while most of the ultimate particles are within the size range of from 0.1 to 0.4 micron, there is a large weight percent of aggregates much larger in diameter. These aggregates consist of several of the ultimate particles fused or otherwise bonded together, and may range in size from about 0.4 to 4.0 microns. Aggregates larger than 4 microns in size are ordinarily separated from the pigment body by hydroclassification procedures, but the 0.4–4 micron aggregates usually constitute such a large weight proportion of the pigment mass that they cannot economically be reworked or discarded. For this reason, most of the titanium dioxide pigments of commerce contain up to 80 weight percent, and usually between 10% and 70% of aggregates in this size range.

We have found that when titanium dioxide pigments of this character, containing substantial amounts of oversize aggregates in the size range of from 0.4–4 microns, are subjected to the selective grinding or attrition procedure hereinafter described, there is a remarkable improvement in their tint tone as well as a substantial increase in their tinting strength. The removal of the oversize aggregates causes a shift in tint tone toward the blue, so that the pigment has a bluer tint tone after grinding by our process than it had previously. The ultimate tint tone will of course depend on the tone of the particular pigment being treated; most of the rutile titanium dioxide pigments of commerce are essentially brown in tint tone and may have, for example, a tint tone of about a Brown 4 to a Brown 1. We have found that their tone can be changed to a blue tint tone by removing substantially all aggregates larger than about 0.8 micron in diameter and when this is done the ultimate value may become as blue as a Blue 2.

Many anatase pigments, on the other hand, are inherently bluer in tint tone than are rutile pigments; typical prior art anatase pigments may have a tint tone ranging from a Brown 3 to a Blue 2. The tint tone of these pigments is, however, also materially improved when their oversize aggregates are broken down by the process of the present invention, and when substantially all aggregates larger than 0.8 micron in diameter have been removed their tint tone is usually at least a Blue 4.

The ultimate tinting strength of titanium dioxide pigments treated by the process of our invention will likewise depend primarily on the strength of the pigment being treated, and is best expressed on a percentage basis. Thus upon treating both rutile and anatase pigments of the prior art it is always possible to obtain an improvement in the original tinting strength of at least 3%, and more usually improvements within the range of 5–25% are obtained. It will be understood, of course, that the percentage of improvement is greater when the process of our invention is applied to a raw pigment of poor optical properties than when one of relatively good optical properties is treated.

In carrying out the process of our invention a particulate rutile or anatase titanium dioxide pigment mixture, containing substantial amounts of oversize aggregates as above described, is slurried in an inert liquid, preferably water, along with about 2–20 and preferably about 5–15 times its weight of inert grinding particles having a particular particle size. In order to obtain the advantages of the present invention this particle size must be within the range of from about 10–40 mesh; particles larger than about 10 mesh in diameter and also particles finer than about 40 mesh (ASTM Specification E-11) have little or no capacity to subdivide aggregates in the 0.4–4 micron size range. The slurry so prepared is then subjected to mechanical agitation of a severity sufficient to cause the grinding particles to break down the oversize aggregates into ultimate particles and smaller size aggregates. This type of agitation is continued until the body of pigment particles has a materially reduced content of oversize aggregates, and in producing the novel pigments of our invention it is continued until the pigment body is substantially free from aggregates larger than about 0.8 micron in diameter. The resulting mixture is then separated from the grinding particles, preferably by screening, after which it is separated from the inert liquid by centrifuging or filtration and dried to a pigment powder. After drying, and preferably following a final disintegration in a fluid energy mill to break up lumps, it will be found that the tinting strength of the pigment has materially increased and its tint tone has become bluer as described above.

The particular kind of mechanical agitation to be applied to the slurry of grinding particles and pigments constitutes a specific feature of our process. In accomplishing the objectives of our invention the effective velocity of the grinding particles, as calculated from the rate of rotation or movement of the mechanical equipment, is the controlling factor. For example, in the case of the disc mill described in Example 4 the peripheral speed of the disc determines the effective velocity of the grinding particles. In a shaker mill, the average rate of linear movement in one direction determines the maximum effective velocity of the grinding particles. As for a pebble mill, the peripheral speed of the mill is the maximum velocity of the grinding particles. In the case of a Banbury or sigma blade mixer, the peripheral speed of the blade is, for our purpose, the maximum and effective velocity of the grinding particles. For the purpose of the present specification and the appended claims, severe effective mechanical agitation is that which imparts to the grinding particles a velocity within the range of from about 300 to about 3,000 feet per minute, and more usually about 500 to 3,000 feet per minute. Severe mechanical agitation may be accomplished by such mechanical agitators as a disc mill, an impeller blade agitator, a vibrating mill, etc. The important and unexpected advantage of such severe mechanical agitation is that it will cause the oversize aggregates in a body of titanium dioxide pigment to break down so quickly that the process is commercially feasible; thus when the suspending liquid is water or an aqueous solution it is possible to obtain a 3 percent increase in the tinting strength of some pigment mixtures in as little as 5 minutes, and grinding times of 15 to 60 minutes are usually recommended. This type of agitation is therefore especially well suited for use in a continuous operation wherein a stream of the pigment slurry is passed continuously through a disc mill or other apparatus capable of imparting severe mechanical agitation.

It will be understood, however, that (at least in theory) the process of our invention can also be carried out by using a more moderate mechanical agitation, as in a screw-type kneader or in a relatively slow-moving ball mill wherein the grinding particles attain velocities within the range of from 1 to 300 feet per minute. We consider this type of grinding to be relatively impractical, however, since actual grinding times of from 1 to 24 hours and usually about 8 to 30 hours would be required, even in an aqueous suspending medium, to obtain a 3 percent improvement in tinting strength.

The grinding material which can be used for the purpose of the present invention can be any tinctorially inert material which is abrasion resistant and not capable of discoloring the pigment under the conditions of use as contemplated herein. For this purpose, a large variety of grinding materials may be employed, e.g., silica, alumina, zirconia, sodium chloride, rutile titanium dioxide, etc.

The raw titanium dioxide pigment and the grinding material are slurried in an inert liquid medium. The medium is not only incapable of reacting with either the grinding material or pigment, but it is also incapable of discoloring the final pigment product. The liquid medium is also capable of wetting the pigment solids, and in this connection the polar liquids are a suitable class of materials which can be used as media. Examples of liquid materials that may be used as the medium for the treatment of the pigment material are water and organic liquids such as benzene, cyclohexane, turpentine, ethyl acetate, acetone, pyridine, etc. Water is preferred as the liquid medium, because it is cheap, inert and easily separated from the solid materials, namely, the grinding material and the pigment product. Water has another important advantage over the other liquid media, in that, it requires less grinding time than the other liquid media to achieve the same quality of pigment product. Thus the actual grinding times for operations employing non-aqueous media will be longer than for aqueous media when operating under otherwise comparable conditions. The actual residence time for a non-aqueous medium under severe mechanical agitation is about 20 to 150 minutes and more usually about 25 to 75 minutes. In the case of a non-aqueous medium for moderate mechanical agitation, the actual grinding time is about 2 to 80 hours, more usually about 11 to 50 hours; whereas on a superficial basis, the grinding time is about 2 to 110 hours, more usually about 11 to 70 hours.

The grinding treatment of the raw pigment may be measured by the length of time required for the pigment to remain within the grinding zone on either an actual or superficial basis. The superficial residence or grinding time is computed on a basis which does not take into account the volume occupied by the agitating means when present in the treating zone, whereas the actual grinding time is of course the time that a representative portion of the pigment body remains in the equipment. Thus the actual grinding time, for either a batch or continuous operation, when using an aqueous medium under severe mechanical agitation may be about 5 to 90 minutes and more usually about 15 to 60 minutes. On a superficial basis, for same operation, the residence time or grinding time may be about 5 to 80 minutes, and more usually, about 15 to 70 minutes. It should be understood, however, that the period of grinding for an aqueous media may vary outside the ranges given above.

The pH of an aqueous slurry in the grinding treatment may vary considerably. Particularly for commercial purposes, the pH may be from about 3 to 11 and preferably about 7.5 to 10.5. The viscosity of the slurry is also capable of being varied a great deal. For the purpose of this invention, particularly for commercial purposes, the viscosity may be about 25 to 150 cp., more usually about 70 to 100 cp.

The amount of raw titania pigment present in the liquid slurry may vary considerably and it can be relatively low as compared to the grinding material or it can be a fairly large amount. In general, although larger and smaller amounts may be used, the pigment comprises about 10 to 25%, preferably about 18 to 23% of the weight of the slurry, exclusive of the grinding material. In the treating zone, the grinding solids comprise about 40 to 70%, preferably about 45 to 55% of the superficial volume thereof. For the purpose of this specification and the appended claims, the superficial volume excludes the agitating means. With respect to the grinding material, under the conditions of the present invention, we have found that particles finer than about 40-mesh size have little or no capacity to attrite the pigment aggregates. This is a surprising aspect of the present invention, because it was not expected that the particle size of the grinding material would have such a significant effect on the efficiency of the grinding process. As a possible explanation, it appears that the geometry of the finer particles does not provide the area between facing particles by which the agglomerates of the pigment can be trapped and/or pinched or otherwise disintegrated.

The temperature of the slurry containing the grinding solids and the raw pigment appears not to be critical insofar as the grinding efficiency of the process is concerned. It has been found that temperature has an indirect effect on grinding efficiency through its influence on deflocculation and viscosity. In general, the temperature of the slurry may be very high or very low just so long as a liquid slurry exists; however, for commercial purposes the temperature may vary from about 20° to 95° C., and is conveniently maintained between about 30° and 60° C.

The agitating means to be used in practicing the process of the present invention is preferably a disc agitator. The agitator is preferably made of a series of discs fixed at spaced intervals along the length of the rotating shaft. The discs can be made of a variety of materials, such as nylon, rubber, polyvinyl chloride, neoprene, urethane, ceramic material such as glass, etc. Since the agitating means are subjected to abrasive forces, it is preferred to use urethane, nylon or neoprene as the material of construction. Similarly, the walls of the treating vessel can be lined or coated with rubber, neoprene, urethane or nylon to prevent erosion.

The method of the present invention involves the correlation of residence time, particle size of the grinding particle and the severity of mechanical action to achieve a desired degree of improvement in tint tone and tinting strength of at least about 3%, more usually about 5 to 25%, and still more usually about 5 to 15% in the case of raw rutile or anatase pigment. Without the correlation of the present invention, in the case of non-aqueous media, it is not possible to obtain the exceptionally high quality pigment.

Following the grinding treatment, the pigment product may be subjected to any of the known end treatments to produce a commercial product. For example, the ground pigment may be classified, surface treated, dried and/or dry milled, etc.

The invention will be further described and illustrated by specific examples which demonstrate the improvements obtainable with various types of particulate titanium dioxide pigments. Because rutile titanium dioxide obtained by the sulfate process responds particularly well to our grinding procedure, it is used in several of these examples. This material, which was also the source of the samples depicted in FIGS. 1 and 2 of the drawings, was made by the following procedure:

Finely ground ilmenite ore was digested with concentrated sulfuric acid to produce a digestion cake from which the titanium sulfate was leached with water. After adjusting the reduced titanium content by treatment with metallic iron the resulting solution was concentrated and hydrolyzed by boiling. The hydrolysate was recovered by filtration, mixed with about 0.4% of potassium carbonate and with an alkali metal titanate rutile seed of the type described in U.S. Patent No. 2,494,492 and calcined at 950°–1000° C. for a time sufficient to develop maximum pigmentary properties and obtain a substantially complete conversion to the rutile crystal modification. The discharge from the calciner was micropulverized in a hammer mill and hydroclassified by dispersion in water to remove all material larger than about 4 microns in diameter. The pigment was then finished by applying 1% of hydrous titania and 2% of hydrous alumina; it was then washed and dried and fluid energy milled to break up lumps formed in the dryer. The tinting strength of this pigment is within the range of about 1550 to 1650 units and its tint tone is about a Brown 2 to a Brown 1. After grinding by the process of the present invention it is improved to a tinting strength of at least 1650–1700 units, and this may be as high as 1800 or more, and its tint tone is changed to a Blue 1 to Blue 4. The improved pigment still retains, however, the unusually good weathering characteristics held by the conventionally known pigments.

FIG. 1 of the attached drawings is an electron micrograph of a representative sample of the raw pigment at 20,000 diameters. The large proportion of clusters or aggregates larger than 0.4 micron in diameter can readily be seen, together with a smaller proportion of ultimate particles less than 0.4 micron in diameter.

FIG. 2 of the drawings is an electron micrograph, at 20,000 diameters, of the pigment of FIG. 1 after it had been subjected to the selective grinding procedure of the present invention. The grinding procedure used was that of Example 4, and the particular sample was taken from Run No. 3 of that example. The fragmentation of the oversize aggregates of FIG. 1 into ultimate particles of less than 0.4 micron diameter and aggregates not larger than 0.8 micron in diameter is clearly shown.

FIG. 3 of the drawings is a graphical interpretation of the improvement in the pigment of FIG. 2 over that of FIG. 1. The graph was prepared from the electron micrographs by counting the number of aggregates per unit area in each case and measuring their diameter. It will be seen that the selective grinding treatment increases materially the proportion of pigment particles in the 0.2–0.4 micron range with a corresponding reduction in the amount of oversize aggregates. We regard the pigment of FIG. 2 as an unobvious and patentable composition of matter, since it is substantially free from oversize aggregates and has the novel combination of increased tinting strength and blue tint tone described above.

A particulate anatase titanium dioxide pigment suitable for improvement by our selective grinding procedure is prepared by exactly the same procedure described above for the preparation of rutile except that the addition of a rutile seed to the hydrated titanium oxide hydrolysate is omitted. When this is done the hydrolysate calcines to the anatase crystal structure because it originated from the titanium salt of a dibasic acid. Finished anatase pigments of the prior art, prepared by this procedure and having a high content of oversize aggregates in the 0.4–4 micron range, may have a tint tone ranging from a Brown 3 to a Blue 2 and a tinting strength ranging from about 1150 to 1400 units or slightly higher. After grinding by the process of our invention until substantially all aggregates larger than 0.8 micron in diameter have been eliminated such a pigment will have a tint tone of at least Blue 4, a tinting strength of at least 1250–1400 and at least 3 percent higher than that of the starting material, and an ultimate particle size within the range of about 0.1 to 0.4 micron.

The invention is further illustrated by the examples which follow. These examples consttiute specific embodiments of the invention and are not to be construed as limitations thereon.

*Example 1*

The following illustrates the treatment of titanium dioxide pigment according to the present invention and shows the effect of the diameter of the grinding particles in improving the tint tone and tinting strength (opacity) of the pigment.

A series of fluid grinding slurries are prepared according to the following procedure.

In a 1-quart porcelain jar are placed 250 cc. (300 g.) of a 25% by weight aqueous suspension (specific gravity 1.2) of a commercial sulfate-process titanium dioxide calciner discharge which has been ground and hydroclassified to remove aggregates larger than about 4 microns in diameter and 750 g. (280 cc.) of Ottawa silica sand of mesh size shown in the table below. The slurries contain about 57% solids by volume. The jars are capped and laid on laboratory rolls and are rotated at 78 r.p.m. for 4 hours. The agitation imparts to the grinding particle a maximum velocity of about 150 feet per minute.

The contents of the jars are then removed, the grinding particles are removed by screening through a 100-mesh screen, and the tint tone and tinting strength of the pigment samples are determined by standard laboratory methods.

The procedure is repeated with glass beads ¼" in diameter as grinding particles to illustrate the effect of too large particles and a control run is made in which no grinding particles are used. Results are as follows:

| Run No. | Grinding Particles, mesh | Tint Tone | | Tinting Strength [b] | |
|---|---|---|---|---|---|
| | | Found [a] | Incr., Points | Found | Incr. percent |
| Control | None | Brown 4 | | 1,600 | |
| 1 | (¼") | ----do---- | 0 | 1,600 | 0 |
| 2 | −10+20 | Blue 1 | 5 | 1,700 | 6.25 |
| 3 | −20+30 | ----do---- | 5 | 1,700 | 6.25 |
| 4 | −30+40 | ----do---- | 5 | 1,700 | 6.25 |
| 5 | −60+80 | Brown 3 | 1 | 1,620 | 1.25 |
| 6 | −100+180 | Brown 4 | 0 | 1,600 | 0 |

[a] By forming a standard paint from each sample of pigment and visually comparing pull-downs prepared therefrom. Units represent arbitrary points of differences from laboratory standard. On this scale, Brown 4 represents about the brownest tint tone pigment that is ordinarily accepted commercially.
[b] Based on value of 100 for white lead; for details of method see H. A. and G. G. Sward, "Physical and Chemical Evaluation of Paints, Varnishes, Lacquers and Colors," 10th Ed. (May 1946), Henry A. Gardner Laboratory, Inc., indicates approximate relative opacities.

Comparison of the electron photomicrographs of the pigment of the control run and the pigment product of Run 4 shows that the treatment causes extensive comminution or break-up of the aggregates which constitute the 0.4 micron–4 micron fraction of the pigment of the control run.

*Example 2*

The following illustrates the effect of the duration of grinding on the tinting strength and tint tone of the pigment.

A grinding slurry is prepared corresponding to that employed for Example 1, Run No. 3, except that a pigment of different tint tone is employed. Portions are subjected to grinding for the durations of time shown in the table below, with the following results.

| Run No. | Duration of Agitation, Hours | Tint Tone | | Tinting Strength | |
|---|---|---|---|---|---|
| | | Found [a] | Incr., Points | Found [a] | Incr., percent |
| Control | None | Brown 5 | | 1,590 | |
| 1 | 4 | Brown 2 | 3 | 1,660 | 4.4 |
| 2 | 7 | Brown 1 | 4 | 1,660 | 4.4 |
| 3 | 14 | Blue 1 | 6 | 1,670 | 5.0 |

[a] By method of Example 1.

*Example 3*

The following illustrates the comparative effectiveness of intensive shaking as a method of agitation.

A 1-quart porcelain jar is charged with 300 cc. of the same TiO₂ slurry (tinting strength of 1600 units) as used in Example 1 and 1000 g. of −20 +30 mesh Ottawa sand. The jar is capped and placed on a commercial paint can shaker and operated at full speed (approximately 5 sharp shakes per second) for 30 minutes. The agitation imparts to the grinding particles a maximum velocity of about 300 feet per minute.

The contents of the jar are then removed, the grinding particles are separated by screening, and the tinting strength and tint tone of the pigment are determined by the method used in Example 1.

The product is avaluated by the method of Example 1. It has a tinting strength of 1660 (an increase of 3.75%) and a tint of "Standard" (an increase of 4 points). If the agitation is continued for an additional 15 minutes, the tinting strength increases to 1710 (an increase of 6.8%) and tint tone of Blue 1 (an increase of 5 points).

*Example 4*

The following illustrates the effectiveness of a rapidly rotating disc as a method of agitation.

A grinding slurry is prepared corresponding to that employed in Example 1, Run No. 3, except that the pigment employed has a tint tone of Brown 2 and an opacity of 1640, and a different grinding means is employed.

The grinding means corresponds in structure in a qualitative sense to that disclosed in FIGURE 1 of Hochberg U.S. Patent No. 2,581,414 and consists essentially of a 1-liter beaker wherein a motor-driven solid nylon disc ¼" in thickness and 3" in diameter is located 1" above the bottom of the beaker. 250 mm. of water, 70 grams raw rutile pigment and 1050 grams of sand (−20 +30 mesh) are placed in this apparatus and the disc rapidly rotated (1700 r.p.m.) as a result of which the slurry is stirred for the times shown in the table below. The agitation imparts to the grinding particles a maximum velocity of about 1350 feet per minute. The pigment is recovered by screening through a 100-mesh screen and tested by the method of Example 1. Results are as follows:

| Run No. | Minutes Stirred | Tint Tone | | Tinting Strength | |
|---|---|---|---|---|---|
| | | Found | Incr., Points | Found | Incr., Percent |
| Control | | Brown 2 | | 1,640 | |
| 1 | 5 | Blue 1 | 3 | 1,690 | 3.0 |
| 2 | 15 | ----do---- | 3 | 1,730 | 5.5 |
| 3 | 30 | ----do---- | 3 | 1,740 | 6.0 |

*Example 5*

The foregoing is repeated except that saturated sodium chloride brine is used as the aqueous phase and sodium chloride screened to −20 +30 mesh is used as the grinding material. The results are substantially the same.

*Example 6*

The following illustrates the effectiveness of synthetic rutile as the grinding agent.

A 2-quart porcelain ball mill jar is half filled with 2100 g. of synthetic rutile −20 +30 mesh in size. To this is added 500 cc. of the same TiO₂ slurry as used in Example 1. The jar is capped and rolled at 105 r.p.m. for 4 hours. The agitation imparts to the grinding particles a maximum velocity of about 150 feet per minute. The pigment is screened off and tested by the method used in Example 1.

This pigment has a tinting strength of 1710 (an increase of 6.7%) and a tint tone of Blue 1 (an improvement of 5 points).

*Example 7*

The procedure of Example 6 is repeated using natural −20 +30 mesh zirconia. Results are substantially the same.

*Example 8*

The procedure of Example 1 is repeated except that propanol, benzene, carbon tetrachloride, ethyl acetate and methyl ethyl ketone are separately employed as fluids in place of the water, and are removed by filtration with evaporation of the residue from the pigment. In each case an improvement of at least 5% in tinting strength of finished pigment is obtained, however, it required longer grinding times than it took to achieve the same improvement with an aqueous medium.

*Example 9*

600 grams of raw titanium dioxide pigment produced by the oxidation of TiCl₄ and having a tinting strength of 1710 units and a tint tone of Brown 1 were added to a porcelain jar mill. 1500 ml. of water and 4000 grams of 20–30 mesh Ottawa silica sand were added to the jar mill. The mill was capped and placed on rollers and then rotated for a period of 16 hours. The agitation imparted to the grinding particles a maximum velocity of 150' per minute. The contents of the jar were removed and passed through 100 mesh sieve in order to separate the sand therefrom. The pigment slurry was then examined by the procedures given in Example 1, above, and the final pigment product was found to have a tinting strength of 1780 units (an increase of 4%) and a tint tone of Blue 2 (a decrease in brownness of 3 points).

It will thus be seen that the pigment material to be treated in accordance with the present invention may be either rutile or anatase which has been previously calcined or prepared at a high temperature with or without calcination such as in the combustion of TiCl$_4$ with oxygen. The raw pigment may contain from about 1 to 80%, more usually 10 to 70% of oversize aggregates, which as previously indicated, have particle sizes from about 0.4 to 4.0 microns. The rutile pigment may have a tint tone as low as about a Brown 5 and a tinting strength of about 1520 to 1620 units, as measured by the methods used in Example 1 herein above. It is also contemplated using for the purpose of this invention a raw rutile pigment which has been previously hydroclassified so that it has a tint tone of a Brown 2 to a Brown 1. The raw rutile pigment to be treated by means of the process of the present invention may also be one having a tint tone of about a Brown 2 to a Brown 1 and a tinting strength of about 1600 to 1650 units. With respect to anatase, it is contemplated that as a raw material it will have a tint tone ranging from a Brown 3 to a Blue 2 and a tinting strength of about 1150 to 1400. The anatase raw pigment will be treated to produce a finished product having a tint tone of at least a Brown 1 and a tinting strength ranging from about 1250 to 1400 units or higher. On the other hand, the raw rutile pigment will be treated to produce a finer product having a tint tone ranging from Blue 1 to Blue 4 and a tinting strength of about 1650 to 1800 units or higher, more usually about 1700 to 1780 units. In addition, such pigments are less abrasive than conventionally known pigments. An important aspect of the improvement, which is achieved by means of the present invention, is the extent of optical improvement of the finished pigment. In the case of raw rutile or anatase pigment, it is possible to obtain an improvement in the original tinting strength ranging from at least 3% and more usually about 5 to 25%. It should be understood, however, that the extent of improvement is usually greater when using a raw pigment of poor optical properties than one of relatively good optical properties.

We have described the process of our invention as one in which the ground titanium dioxide pigments are separated from the water or other suspending medium, dried and powdered. It will be understood, however, that drying of the pigment is not always necessary. On the contrary, the finished pigments may be converted into the water slurries suitable for use in latex paints, as beater additives in paper manufacture, and for other similar purposes. Thus, for example, the ground pigment, after separation from the grinding particles, may be separated from the bulk of the water or other suspending agent by filtration or other means and then reslurried in pure water, with or without a suspension agent, to a desired solids content. The resulting slurry is suitable for the purposes outlined above, and can therefore be marketed to the consumer in drums, tank cars and other suitable containers for liquid shipment.

What we claim is:

1. A method of imparting both a bluer tint tone and increased tinting strength to a particulate titanium dioxide pigment mixture wherein the ultimate particles are less than 0.4 micron in diameter but which contains substantial amounts of oversize aggregates in the size range of from 0.4 to 4 microns and is substantially free from particles larger than about 4 microns which comprises preparing a slurry in an inert liquid of said pigment mixture together with about 2 to 20 times its weight of inert grinding particles having an average size of about 10 to 40 mesh, subjecting the slurry to mechanical agitation and thereby causing the grinding particles to break down the said oversize aggregates into ultimate particles and smaller size aggregates, continuing the agitation until the body of pigment particles has a materially reduced content of oversize aggregates, its tint tone has become bluer, and its tinting strength has increased materially, and then separating the resulting pigment mixture from the grinding particles, separating it from the inert liquid, and drying it to a pigment powder.

2. A method according to claim 1 wherein the agitation is continued until the tinting strength of the pigment mixture has increased by at least three percent.

3. A method according to claim 2 wherein the weight of the inert grinding particles is about 5 to 15 times the weight of the pigment.

4. A method of imparting both a bluer tint tone and increased tinting strength to a particulate titanium dioxide pigment mixture wherein the ultimate particles are less than 0.4 micron in diameter but which contains substantial amounts of oversize aggregates in the size range of from 0.4 to 4 microns and is substantially free from particles larger than about 4 microns which comprises preparing a slurry in water of said pigment mixture together with about 2 to 20 times its weight of inert grinding particles having an average size of about 10 to 40 mesh, subjecting the slurry to mechanical agitation and thereby causing the grinding particles to break down the said oversize aggregates into ultimate particles and smaller sized aggregates, continuing the agitation until the body of pigment particles has a materially reduced content of oversized aggregates, its tint tone has become bluer, and its tinting strength has increased materially, and then separating the resulting pigment mixture from the grinding particles.

5. A method according to claim 4 wherein the agitation is continued until the tinting strength of the pigment mixture has increased by at least three percent.

6. A method of producing an improved titanium dioxide pigment which comprises preparing a slurry in water of a particulate rutile titanium dioxide pigment mixture having a brown tint tone, ultimate particles from 0.1 to 0.4 micron in diameter and a substantial content of oversize aggregates in the size range of from 0.4 to 4 microns but substantially free from particles larger than about 4 microns together with about 2 to 20 times its weight of inert grinding particles having an average size of about 10 to 40 mesh, subjecting the slurry to a mechanical agitation of a severity such as to cause the grinding particles to break down the said oversize aggregates into ultimate particles and smaller size aggregates, continuing the agitation until the pigment mixture exhibits a blue tint tone, an increase in tinting strength of at least three percent, and substantial freedom from aggregates larger than 0.8 micron in diameter, and then separating the resulting pigment mixture from the grinding particles, separating it from the water, and drying it to a pigment powder.

7. A method as defined in claim 6 wherein the mechanical agitation is such as to impart an effective velocity of from 300 to 3,000 feet per minute to the grinding particles and the grinding time is within the range of from 5 to 90 minutes.

8. A method of producing an improved titanium dioxide pigment which comprises preparing a slurry in water of a particulate anatase titanium dioxide pigment mixture having a tint tone ranging from Brown 3 to Blue 2 and a tinting strength of about 1150 to 1400, ultimate particles from 0.1 to 0.4 micron in diameter and a substantial content of oversize aggregates in the size range of from 0.4 to 4 microns but substantially free from particles larger than about 4 microns together with about 2 to 20 times its weight of inert grinding particles having an average size of about 10 to 40 mesh, subjecting the slurry to a mechanical agitation of a severity such as to cause the grinding particles to break down the said oversize aggregates into ultimate particles and smaller size aggregates, continuing the agitation until the pigment mixture exhibits a tint tone of at least Brown 1, an increase in tinting strength of at least three percent, and substantial freedom from aggregates larger than 0.8 micron in diameter, and then separating the resulting pigment mixture from the grinding particles, separating it from the water, and drying it to a pigment powder.

9. A method as defined in claim 8 wherein the mechanical agitation is such as to impart an effective velocity of from 300 to 3,000 feet per minute to the grinding particles and the grinding time is within the range of from 5 to 95 minutes.

10. A method according to claim 4 in which the ground pigment, after separation from the grinding particles, is separated from the water, and is dried and fluid energy milled to produce a powdered product.

11. A method according to claim 4 in which the ground pigment, after separation from the grinding particles, is separated from most of the water and is then reslurried in water to produce a pigment suspension.

12. A method according to claim 1 wherein the grinding particles are silica sand.

References Cited

UNITED STATES PATENTS

| | | | |
|---|---|---|---|
| 2,378,432 | 5/1942 | Rethwisch et al. | 241—21 |
| 2,581,414 | 1/1952 | Hochberg | 241—22 |
| 3,126,293 | 3/1964 | McSheehy et al. | 241—22 |

WILLIAM W. DYER, Jr., *Primary Examiner.*

GERALD A. DOST, *Examiner.*